Dec. 4, 1928.

W. E. SYKES 1,694,042

MACHINE FOR CUTTING GEAR TEETH

Filed Dec. 28, 1923    10 Sheets-Sheet 1

Inventor
William E. Sykes
By Henry E. Rockwell
Attorney

Dec. 4, 1928.

W. E. SYKES 1,694,042

MACHINE FOR CUTTING GEAR TEETH

Filed Dec. 28, 1923    10 Sheets-Sheet 3

Inventor
William E. Sykes
By Henry E. Rockwell
Attorney

Dec. 4, 1928.

W. E. SYKES 1,694,042

MACHINE FOR CUTTING GEAR TEETH

Filed Dec. 28, 1923   10 Sheets-Sheet 5

Inventor

William E. Sykes

By Henry E. Rockwell

Attorney

Dec. 4, 1928.

W. E. SYKES 1,694,042

MACHINE FOR CUTTING GEAR TEETH

Filed Dec. 28, 1923   10 Sheets-Sheet 6

Inventor
William E. Sykes
By Henry E. Rockwell
Attorney

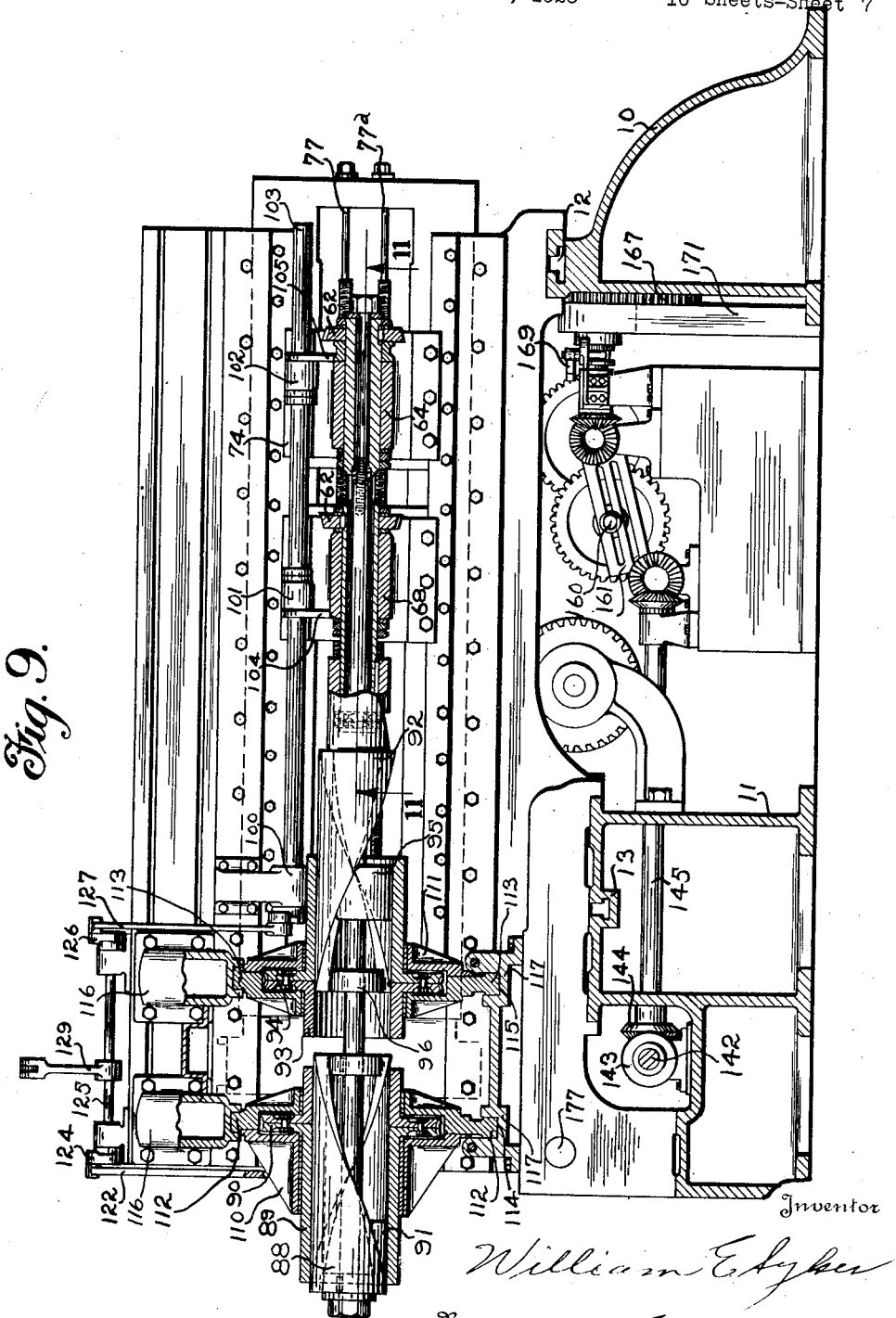

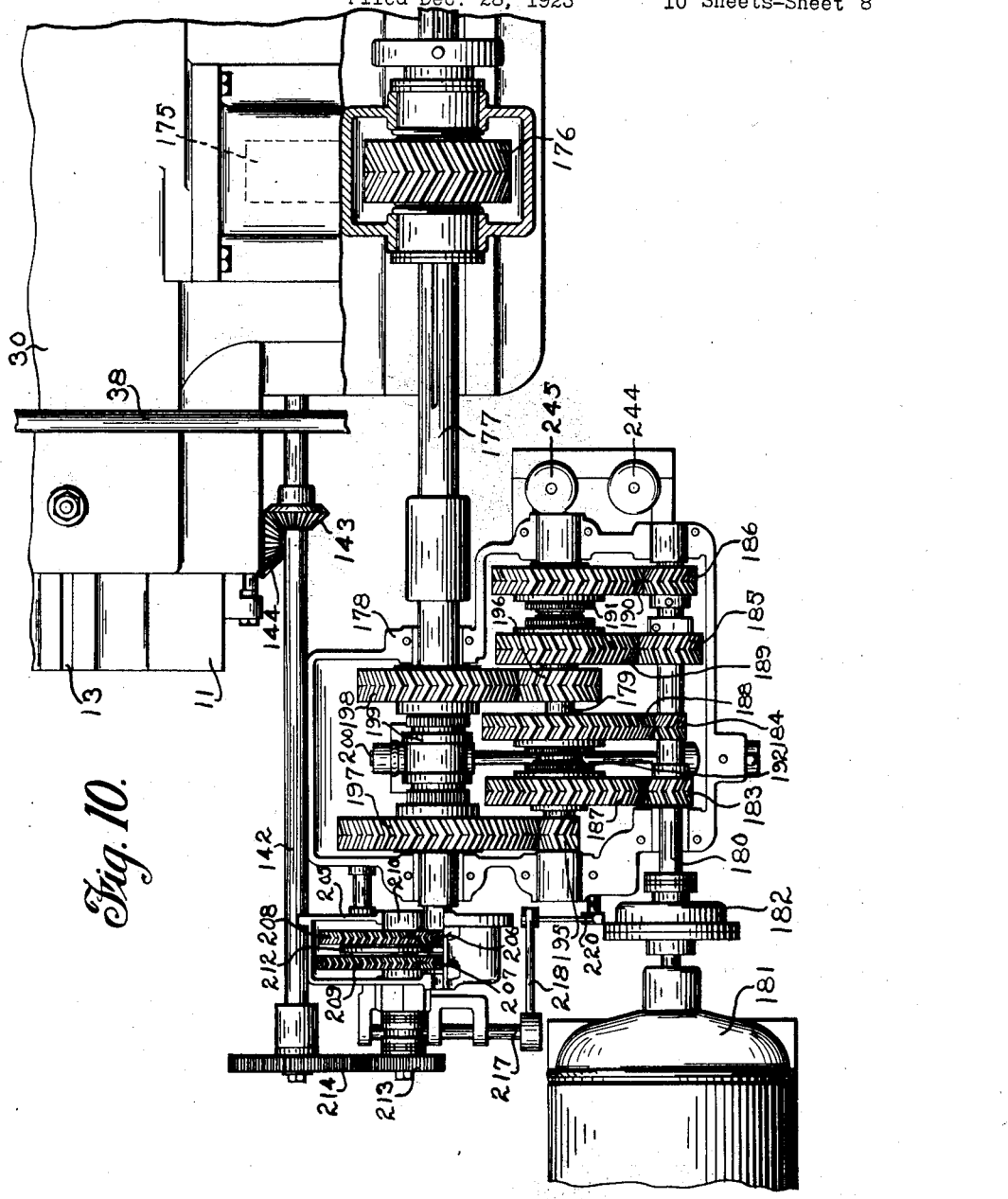

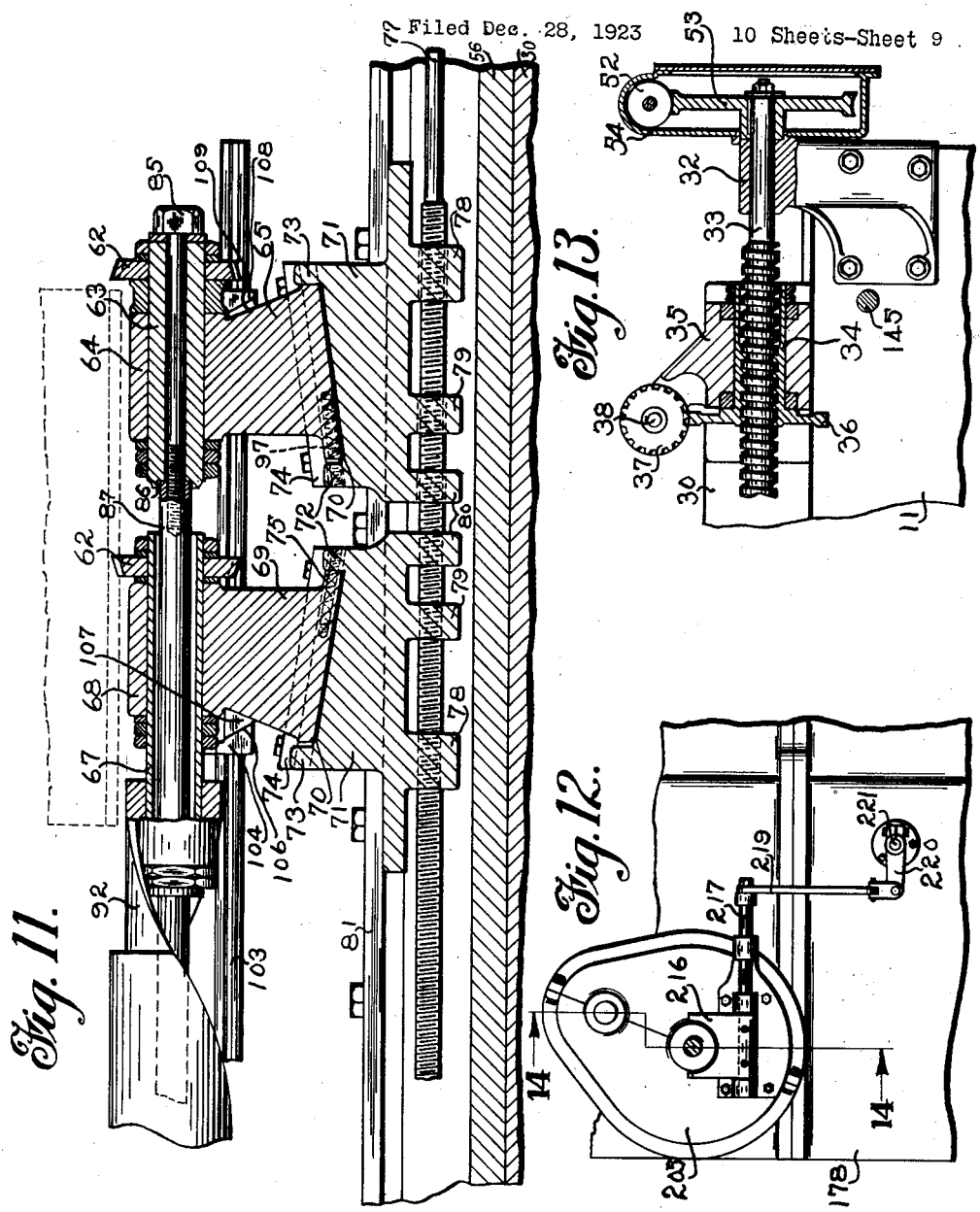

Dec. 4, 1928.

W. E. SYKES 1,694,042

MACHINE FOR CUTTING GEAR TEETH

Filed Dec. 28, 1923    10 Sheets-Sheet 10

Inventor
William E. Sykes
By Henry E. Rockwell
Attorney

Patented Dec. 4, 1928.

1,694,042

UNITED STATES PATENT OFFICE.

WILLIAM EDWIN SYKES, OF BUFFALO, NEW YORK.

MACHINE FOR CUTTING GEAR TEETH.

Application filed December 28, 1923. Serial No. 683,188.

This invention relates to improvements in machines for forming the teeth of gears, and while the invention comprises certain features which will be found advantageous in cutting straight toothed gears, such as spur wheels and pinions for example, it is more particularly concerned with a machine for cutting of helical or double helical teeth upon a gear blank, in which one or more cutters are moved across the face of the gear blank during the cutting operation. The cutters are given, besides this reciprocatory movement across the face of the blank, a helical or twisting movement when cutting helical teeth, a bodily relieving movement to enable them to clear the work during their inoperative strokes, and to both cutters and work is imparted a continuous generating feeding movement to present the entire surface of the blank to the cutters.

The present application deals particularly with improvements in machines of the general type shown in my co-pending application, Serial No. 641,126, filed May 24, 1923, and is concerned with certain features of construction designed to improve the operation of machines of this character, particularly when they are used to cut gear teeth upon relatively heavy blanks or blanks of large diameter. The invention also seeks to improve in certain respects the power transmitting means to the various parts of the machine and the controlling devices by which the transmission of power may be controlled. To this end, I have shown controlling mechanism for the various parts of the machine, such that the control of the machine may be effected almost entirely from one point at the front thereof.

One object of my invention is the provision of improved means for imparting a relative approaching movement to the cutters and blank, so that the cutters may be properly fed up to the blank at the beginning of the cutting operation.

Another object of my invention is to provide a machine of this character in which the blank is mounted in relatively fixed standards with reference to the bed of the machine, the cutters being mounted upon a movable carriage which may be moved toward the blank axis to provide for the engagement of the cutters with the blank and for the proper depth of tooth to be cut.

A still further object of my invention is to provide for the operation of the machine at a plurality of different speeds relatively to the primary source of power.

A still further object of my invention is to provide for the imparting of the generating or feeding movement to the cutters and blank at a plurality of speeds relatively to the reciprocating and twisting movements of the cutters.

A still further object of my invention is to provide means for setting up the cutters to the work which may be operated either manually, or from a suitable source of power, such as an electric motor.

A still further object of my invention is to provide a series of electrically controlled devices for the various operating parts of the machine, so that the operation of these parts may be controlled from a point adjacent the front of the machine readily accessible to the operator.

Further, the invention is designed to simplify generally the operation of machines of this character.

To these and other ends the invention consists of the novel features and combination of parts to be hereinafter described and claimed.

In the accompanying drawings:

Fig. 9 is a sectional view on line 9—9 of Fig. 1.

Fig. 10 is a sectional view on line 10—10 of Fig. 3.

Fig. 11 is a sectional view on line 11—11 of Fig. 9.

Fig. 12 is a sectional view on line 12—12 of Fig. 1.

Fig. 13 is a sectional view on line 13—13 of Fig. 1.

Figure 1:
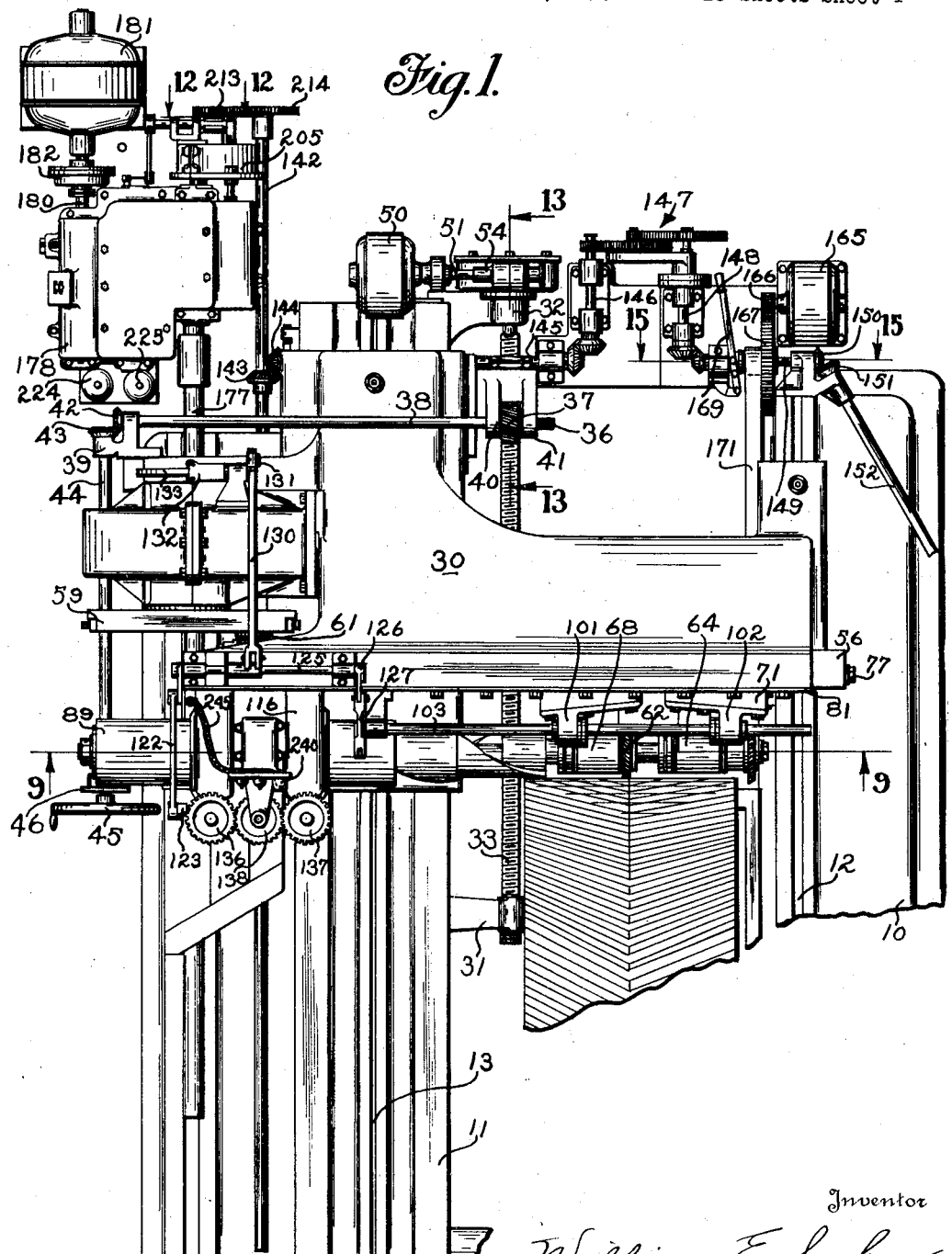
Fig. 1 is a partial plan view of a gear cutting machine embodying my improvements.
Figure 3:
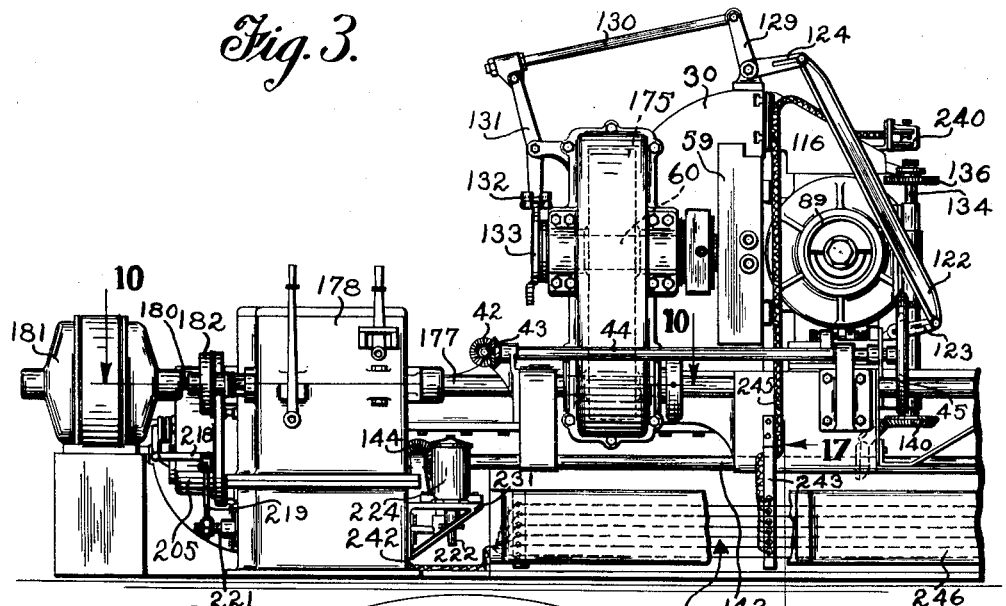
Fig. 3 is a side elevational view of the parts of the machine shown in Fig. 1.
Figure 4:
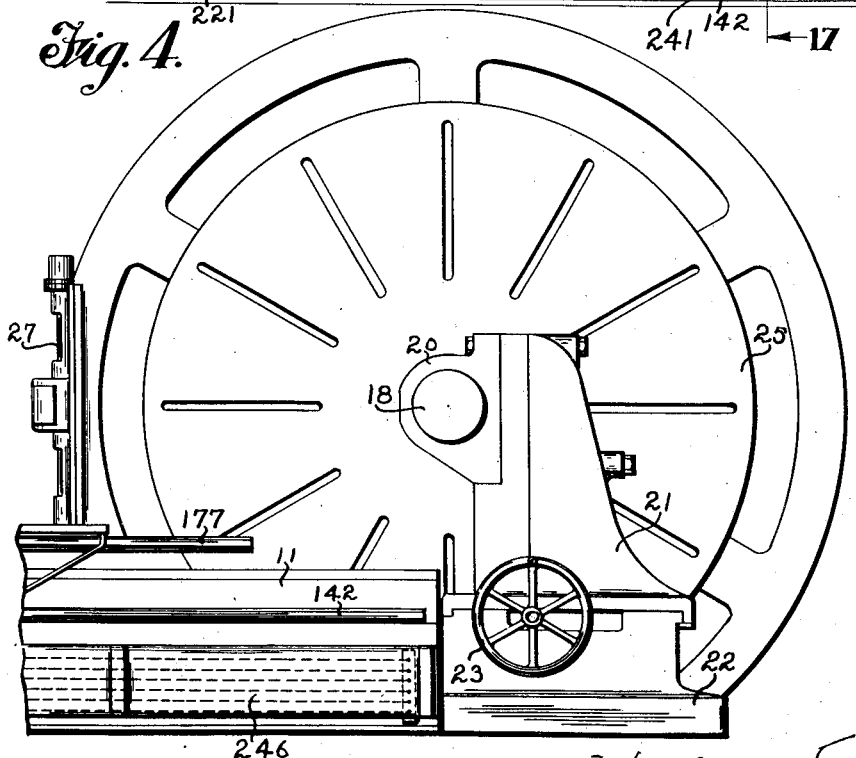
Fig. 4 is a side elevational view of the parts of the machine shown in Fig. 2, the blank being omitted.

Referring more particularly to Figs. 1 and 3, the particular embodiment of my invention which I have selected to illustrate and describe comprises a main base consisting of the bedplates 10 and 11 with the guideways 12 and 13 thereon. At the front portion of the bedplate 10 is mounted a suitable standard 14 provided at its upper end with journals 15 and 16, rotatably carrying a headstock 17 adapted to support one end of the shaft 18 upon which the gear blank 19 is mounted. The other end of the shaft 18 is mounted in a suitable tailstock 20 supported by a standard 21 slidably mounted upon a base-plate 22 at the forward end of the bedplate 11. The standard 21 may be moved longitudinally of the shaft 18 to assist in placing the blank in the machine at the beginning of a cutting operation and remove it therefrom after the teeth have been cut in its periphery. The movement of the standard is accomplished by means of the handwheel 23.

Figure 2:
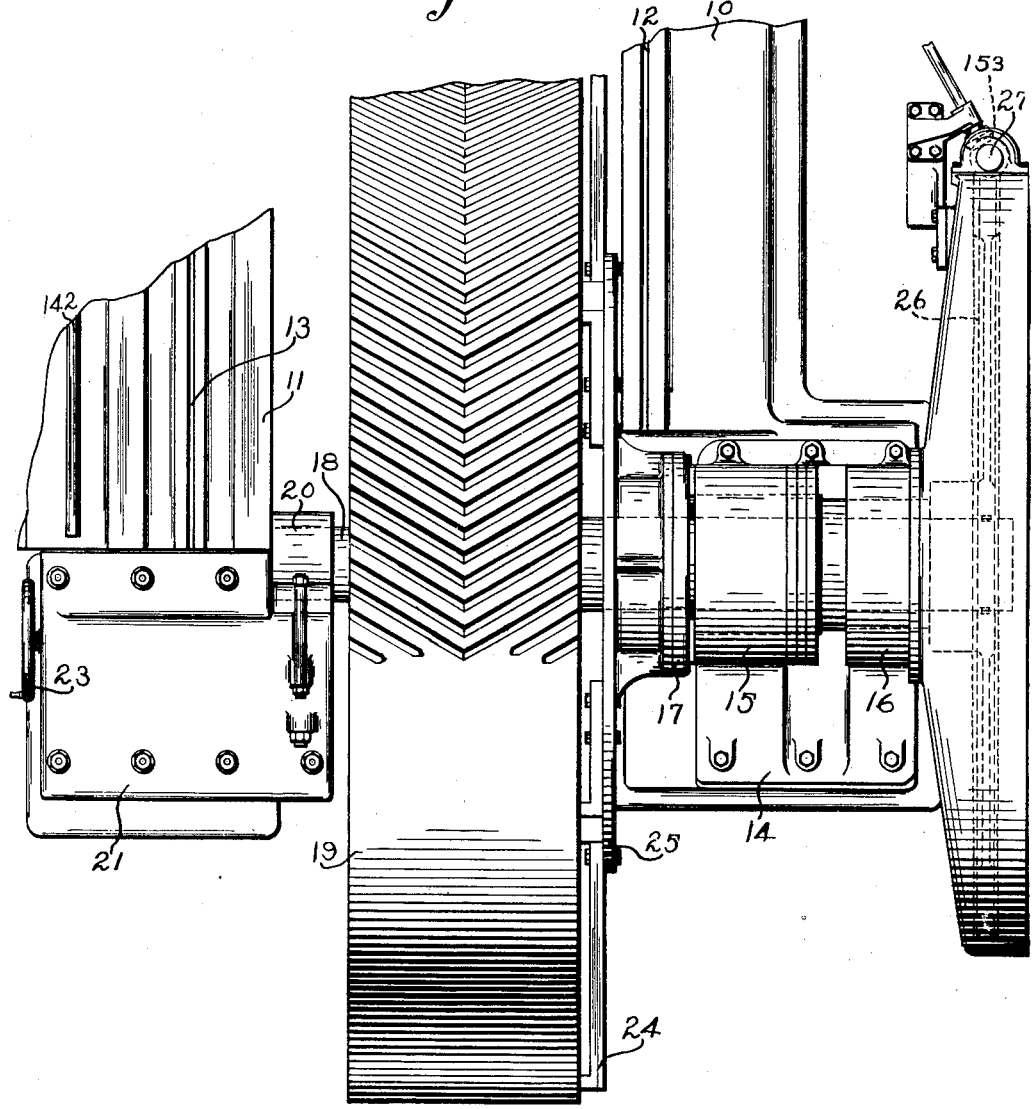
Fig. 2 is a continuation of the view shown in Fig. 1 showing the rest of the machine.

The blank may be lodged against the edges of L shaped arms 24, radially adjustable upon a plate 25 mounted upon the headstock. Upon the right hand end of the blank carrying shaft 18, as shown in Fig. 2, is secured an indexing or wormwheel 26 provided with gear teeth at its periphery with which are adapted to engage the teeth of a worm carried by the shaft 27.

While the tailstock supporting one end of the blank carrying shaft is preferably movable to facilitate the placing of the blank in position in the machine, it may be noted that it is preferred to mount the blank carrying standards in fixed positions relatively to the longitudinal dimensions of the machine, so that there will be no bodily movement of the blank lengthwise of the bedplates 10 and 11.

Upon the bedplates 10 and 11 is slidably mounted a main carriage 30 upon which a large part of the operating mechanism for performing the cutting operation is carried. This main carriage is adapted to be moved toward and from the gear blank, such motion, however, ordinarily taking place at the beginning and end of the operation of the machine upon a blank, as, when the cutters have once been set up to the work so as to cut teeth of the required depth, the entire gear generating operation will usually proceed without any change in the position of the main carriage. To this end I have rotatably mounted in journals 31 and 32 upon the bedplate 11 a threaded shaft 33. This shaft passes through and engages the threads of an internally threaded collar, or bushing, 34, rotatably mounted in a journal 35 secured to the main carriage 30. Upon one end of this bushing is integrally formed a spiral gear 36, the teeth of which are engaged by a second spiral gear 37 mounted upon a shaft 38 rotatably mounted in journals 39, 40 and 41 secured to the carriage. Upon the end of this shaft, opposite the gear 37, is a gear 42 meshing with the gear 43 of a longitudinally disposed shaft 44 mounted in suitable journals on the carriage, and provided at its forward end with a handwheel 45 by which it may be manually operated. A pointer and scale 46 may be provided adjacent the handwheel by which the depth of the cut made in the periphery of the blank may be accurately indicated.

It will be apparent from the foregoing description that when the handwheel 45 is rotated and through it the shafts 44 and 38, spiral gear 36 and collar 34, the turning of this collar on the threads of the rod 33 which is fixed against longitudinal movement in the journal 35, will cause the carriage 30 to move longitudinally of the bedplates 10 and 11. During this operation the rod 33 remains stationary, the internally threaded collar 34 acting as a nut and being moved longitudinally of the bed of the machine by engagement with the threads of the rod.

In order to provide power operated means for moving the carriage along the bedplates 10 and 11, I have mounted at the rear of the machine a motor 50, upon the shaft 51 of which is mounted a worm 52 engaging the teeth of a worm wheel 53 secured to the rear end of the rod 33. The worm 52 and wormwheel 53 may be enclosed in a suitable casing 54. When the motor 50 is set in operation the worm-wheel 53 is rotated, and with it the threaded shaft 33. The threaded collar 34 is prevented from rotation at this time by the engagement of the spiral gear 36 with the gear 37, the collar acting as a stationary nut, and the carriage is thus moved longitudinally of the bedplates by the rotation of the shaft 33. The motor 50 is arranged so that it may be reversed in direction to rotate the rod 33 in the opposite direction to withdraw the cutters from the work when such movement is desired.

At the front portion of the main carriage 30 is provided a guideway 55 in which is mounted a reciprocating slide 56, the slide being held in position by means of upper and lower plates 57 and 58 which project over the edges thereof. This slide is reciprocated by means of a crank 59 secured upon the forward end of a shaft 60 and provided with a crank-pin 61 engaging with the slide.

In the preferred embodiment of my invention shown in the drawings I employ cutters in the form of pinions or gears, as shown at 62 in Fig. 11 of the drawings. As shown in the drawings, these cutters have four distinct movements: a reciprocating movement across the face of the gear blank, each cutter being so controlled that in the cutting of double helical gears the cutting stroke of each cutter ends in a plane at right angles to the blank axis where the two halves of each tooth join; a helical or twisting movement imparted to the cutters during their operative strokes for the cutting of helical teeth; a relief movement whereby each cutter is moved away from the work upon the return stroke so as to effect a slight clearance between the cutter and the work during this stroke; and fourth, a continuous rotating movement at the same peripheral speed as that imparted to the blank, whereby the blank may be continuously fed to the cutters until the entire surface of the former has been operated upon.

To effect the reciprocating movements of the cutters they are secured to the main carriage slide 55 so that they travel with this slide in its movement transversely of the bed. The right hand cutter 62, as shown in Fig. 11, is rigidly mounted upon a sleeve 63, the sleeve being rotatably carried within a journal 64 of a cutter carriage 65. The left hand cutter is similarly keyed to a hollow sleeve 67 rotatably mounted in a journal 68 of a second carriage 69. The cutter carriages 65 and 69 are movably mounted in guideways 70 in blocks 71, in which guideways the carriages have a limited movement between end abutments 72 and 73. The carriages are retained in place in these guideways between the abutments 72 and 73 by means of plates 74, which overlie the upper and lower edges of the carriage bases 75. The supporting blocks 71 are adjustably mounted in the main carriage slide 55 by means of threaded rods 77 and 77ª suitably journaled in the main slide and engaging the threaded lugs 78, 79 and 80 upon the rear faces of the blocks 71. It will be noted that each of these rods is threadedly engaged with the lugs 78, 79 and 80 of only one of the carriage slide blocks 71, and as clearly shown in Fig. 11, passes loosely through the lugs of the other block so as to rotate freely therein. In this manner each rod is engaged with only one of the carriage slide blocks so that each of the blocks may be adjusted across the slide in either direction independently of the other. The blocks 71 are also held in place in guideways in the slide 56 by means of plates 81 which overlie the edges of the blocks. It will be apparent that by rotating the rods 77 and 77ª the cutter carriages, and therefore the cutters, may be independently adjusted along the main slide 56 to properly position each cutter relatively to the slide, and to position the cutters relatively to each other, so that the distance between them may be varied. In this way, the cutters may be adjusted for different sized blanks, as it will be obvious that in order to operate satisfactorily the cutters must not be set closer together than a distance greater than one-half the width of the peripheral face of the blank. In other words, when one cutter is at the middle of the blank or at the extreme end of its cutting operation, the other cutter should clear the edge of the blank so that upon the return stroke a complete cut across the adjacent half of the peripheral face of the blank will be effected.

It will also be apparent that when the shaft 60 is rotated by means to be hereinafter described, the crank 59 will be rotated and the slide 56 will be reciprocated to move the cutters across the face of the blank, as this slide controls the position of the cutters through the agency of the cutter carriages 65 and 69 with their journals 64 and 68.

At the same time that the cutters are reciprocated across the face of the work they are also given a twisting or helical motion if it is desired to cut helical teeth upon the blank. The preferred mechanism for imparting this motion to the cutters is now described.

The sleeve 63 upon which the right hand cutter is mounted is secured by means of a bolt 85 and clutch teeth 86 to the end of a spindle or shaft 87, this spindle passing through the sleeve 67 of the left hand cutter and having secured upon its left hand end a helical guide 88 by any suitable means. The guide 88 is slidably mounted within the hollow hub or sleeve 89 of a worm-wheel 90, and to this hub is secured a helical nut 91 which cooperates with the guide or sleeve 88.

Likewise, the sleeve 67 upon which the left hand cutter is rigidly mounted is rigidly secured to the right hand end of a second helical guide 92 slidably mounted in the hollow hub 93 of a second worm-wheel 94. A helical guiding nut 95 similar to the nut 91 is secured upon the inner surface of the hollow hub 93.

It may be noted that the shaft 87 not only passes loosely through the sleeve 67, but also passes loosely through a collar 96 secured in the rear end of the helical guide 92. As will be hereinafter explained, the worm-wheels 90 and 94 are secured against movement in a direction longitudinally of the shaft 87, and the helical guiding nuts 91 and 95 secured to the hubs of these wheels are likewise fixed against such movement. It will be obvious, therefore, that when the slide 55 is reciprocated, carrying with it the cutter carriages 65 and 69 and the helical guiding sleeves 88 and 92, the sleeves 63 and 67 upon which the cutters are secured, will, due to the camming action of the guiding nuts 91 and 95, impart to the cutters a twisting or helical motion as they are reciprocated across the face of the work. The cutters, will, of course, be twisted or moved along in one direction during the operative or cutting stroke of the cutters, and will be moved in the opposite direction during an inoperative stroke so that the teeth' of the cutters will be properly backed out of the helical grooves which have been cut.

It has been found desirable, particularly in cutting straight gears and in cutting gears in which the angle of the helix is relatively small, to provide a way to relieve each of the cutters at the end of each operative stroke so that when the cutter is being backed out of the work the cutting edge will not drag thereupon. The means by which this is accomplished will now be described.

As has been previously described, the cutter carriages 65 and 69 are mounted in guideways 70 in the blocks 71. As shown in Fig. 11, these guideways are inclined relatively to the axis of the cutters, and as the carriages have a limited movement longitudinally of the guideways between the abutments 72 and 73, it will be apparent that the carriages, and thus the cutters, may be moved toward and away from the work to a limited extent. As shown in Fig. 11, the left hand cutter is practically at the end of its operative stroke and is about to begin its return stroke. The cutter has been carried to this position by contact of the cutter carriage 69 with the abutments 73. When, however, the main slide begins its return stroke, the blocks 71 will have a limited movement independently of the cutter carriage 69 until the abutment 72 is moved against the base of the cutter carriage. During this relative movement the cutter carriage will be permitted to move slightly in the guideway 70, and as this guideway is inclined, will be slightly withdrawn from the work.

The right hand cutter 62 is about to begin an operative stroke and hence the cutter carriage is shown in the position where it is in contact with the abutment 73 of the corresponding block 71. The cutters are normally urged into contact with the abutments 73 by means of springs 97 which react against the abutments 72 and against the carriages. As the cutters are normally urged against the abutments 73 toward the blank upon which they are operating, it has been found desirable to provide some means for forcing the carriages against the abutments 72 against the tension of the springs when each carriage comes to the end of its cutting stroke.

For this purpose I have mounted, in a bearing 100 upon a main frame and in bearings 101 and 102 upon the plates 74, a shaft 103. To this shaft are keyed a pair of camming fingers 104 and 105 adjacent the journals 101 and 102, the camming fingers being attached to these journals so that they are moved longitudinally of the shaft 103 as the cutter carriages and cutters are reciprocated, but are also permitted an oscillating movement with the shaft 103. As shown more particularly in Fig. 11, the camming finger 104 is provided with a camming edge 106 coacting with a complemental cam lug 107 formed integrally with the carriage 69 to urge this carriage against the abutment 72 against the action of the spring 97 when the shaft 103 is oscillated. It will also be understood that when the shaft is returned to its original position, the carriage 69 will again be moved against the abutment 73 by the spring. Likewise, the camming finger 102 is provided with a camming surface 108 which coacts with a cam-lug 109 on the carriage 65 to force this carriage away from the work against the action of its spring 97. As shown in Fig. 11, the left hand cutter has been forced to a position in which it is relieved from the work by the action of the cooperating cam finger 104.

Figure 5:
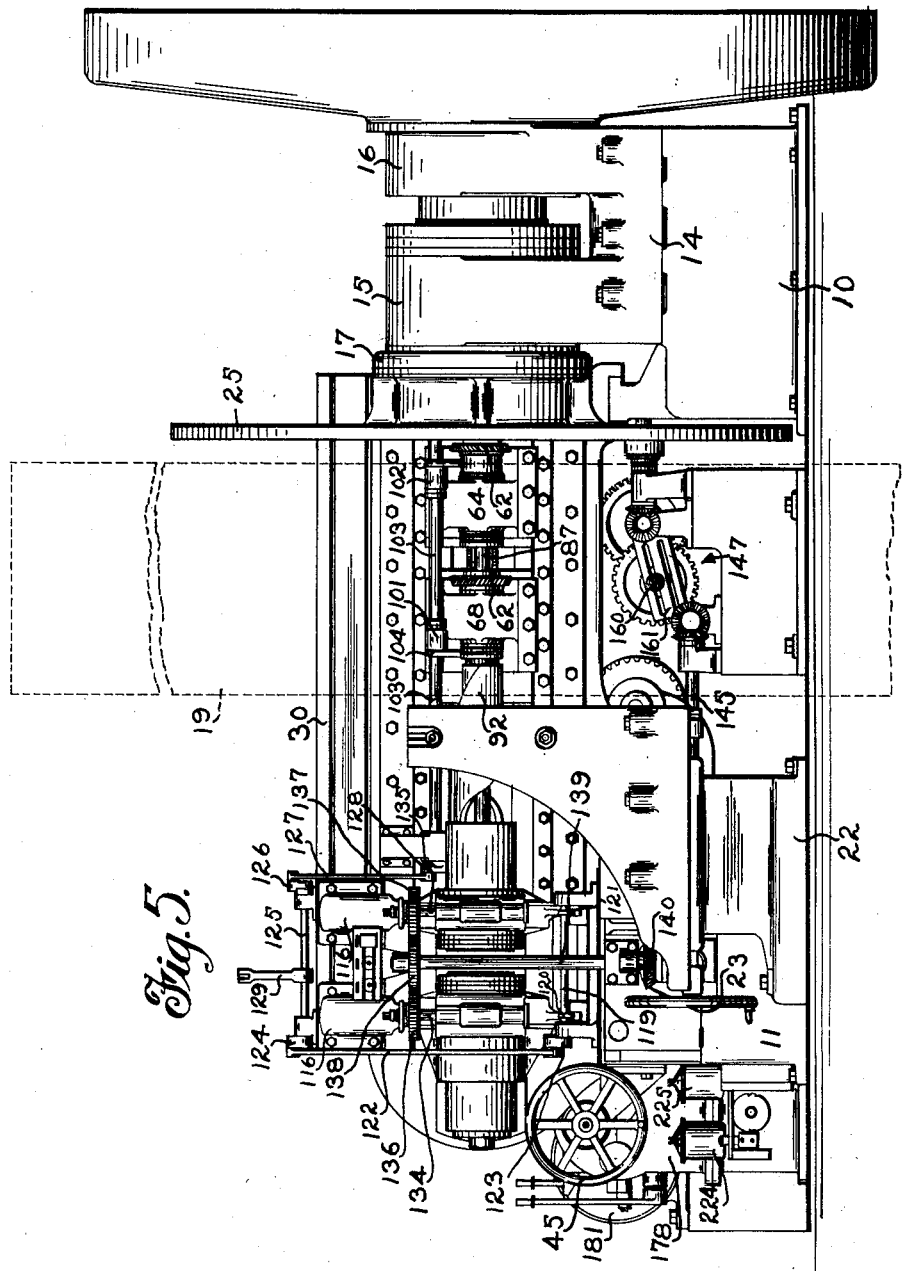
Fig. 5 is a front elevational view of the machine.

It will be apparent that when the cutters are moved toward and away from the work in order that they may be relieved upon their inoperative movement, provision must be made to permit corresponding movement of the shaft upon which these cutters are mounted. The shaft 87 of the right hand cutter which passes through the sleeve 67 is provided with sufficient clearance within this sleeve to permit the slight bodily movement which is necessary and similar movement is also permitted within the collar 96. The helical guides 88 and 92 are, however, closely fitted within the hubs 89 and 93 of the worm-wheels 90 and 94, and it is, therefore, necessary to provide for a bodily movement of these wheels. For this purpose the wheels are mounted within casings 110 and 111, shown more particularly in Fig. 9, which casings are provided at their upper and lower portions with guiding tongues 112 and 113 slidably mounted in guideways 114 and 115 in upper and lower supports 116 and 117 upon the main carriage. In front of the casings 110 and 111, as shown in Fig. 5, is mounted a rock-shaft 119 provided with suitable cams 120 and 121 which act against the faces of the casings to move the latter rearwardly at the instant that the cutters are moved away from the work at the beginning of the return stroke.

Figure 7:
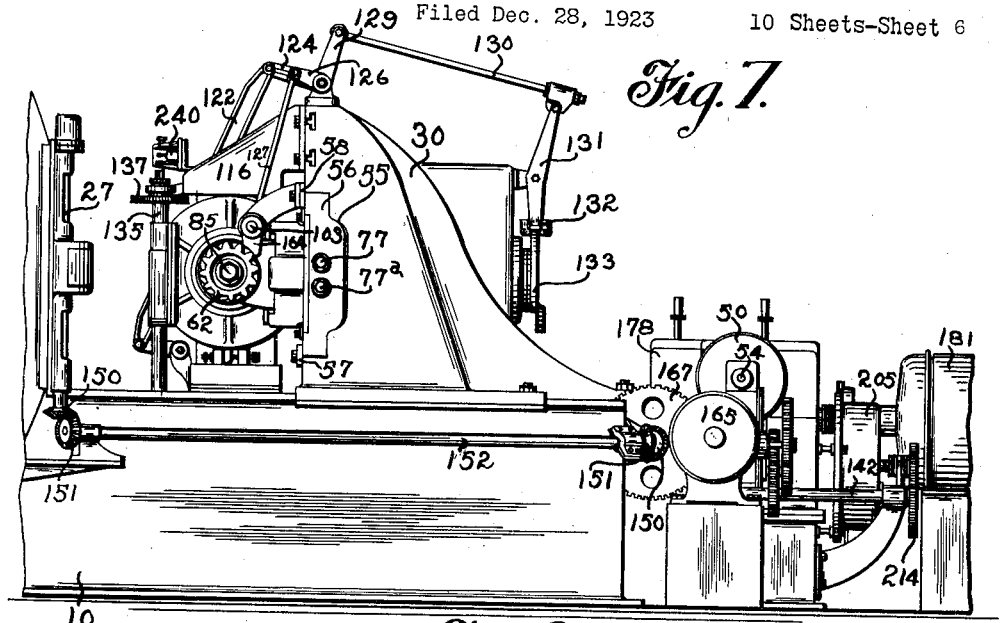
Fig. 7 is a partial side elevational view of the machine from the side opposite that shown in Fig. 3.

A link 122 connects the rock-arm 123 upon the shaft 119 to a rock-arm 124 upon a shaft 125 mounted upon the main carriage, and having at its other end a rock-arm 126 connected by a link 127 to a rock-arm 128 on the shaft 103. The shaft 125 is oscillated by means of an arm 129 connected by a link 130, as shown in Fig. 7, to a lever 131 pivoted at the rear side of the main carriage and bifurcated at its lower end, as at 132, to engage with opposite faces of a cam disk 133 secured to the rear end of the shaft 60. Any suitable means, such for instance as is shown in my co-pending application No. 641,126, may be provided to return the worm-wheel casings to their original position after their release by the cams 120.

To impart a continuous, rotating, generating movement to the cutters, vertically disposed shafts 134 and 135 are mounted at the front of the worm-wheel casings 110 and 111, and upon the shafts are mounted worms (not shown) to engage with the teeth of the worm-wheels 90 and 94. At the upper end of these shafts are provided gears 136 and 137 with which meshes a gear 138 secured to a shaft 139 rotatably mounted in suitable bearings on the main carriage. At its lower end this shaft is provided with a bevel gear 140 driven from a similar gear 141 upon a longitudinally disposed shaft 142 mounted upon the bedplate 11. As the carriage, as has already been described, moves along the bedplate, it will be necessary to mount the gear 141 so that it is slidable along its shaft, in order that power will be transmitted to the shaft 138 regardless of the position of the carriage.

It is, of course, necessary that the blank be rotated at the same peripheral speed as the cutters, and to this end a gear 143 is mounted upon the shaft 142, as shown in Fig. 1, and is engaged by a gear 144 upon a shaft 145. The shaft 145 in turn drives a shaft 146 connected through reducing gearing, designated generally by the numeral 147, to a shaft 148, which in turn drives the shaft 149. A gear 150 on the end of this shaft engages a gear 151 upon the shaft 152 provided at its forward end with a gear 153 in engagment with the gear on the lower end of the worm-shaft 27, which, as has already been described, drives the indexing wheel 26 secured to the shaft of the gear blank. It will be apparent that whenever a rotating motion is imparted to the cutters, a similar motion will be imparted to the blank, and as both cutter and blank are driven by the same shaft 142 it will be apparent that they will be rotated at certain relative speeds. This speed may be changed for blanks of different sizes by the use of different reducing gearing 147, and for this purpose this gearing is mounted upon a stud-shaft 160 adjustable in a slotted arm 161, mounted to swing about the shaft 148.

Figure 6:
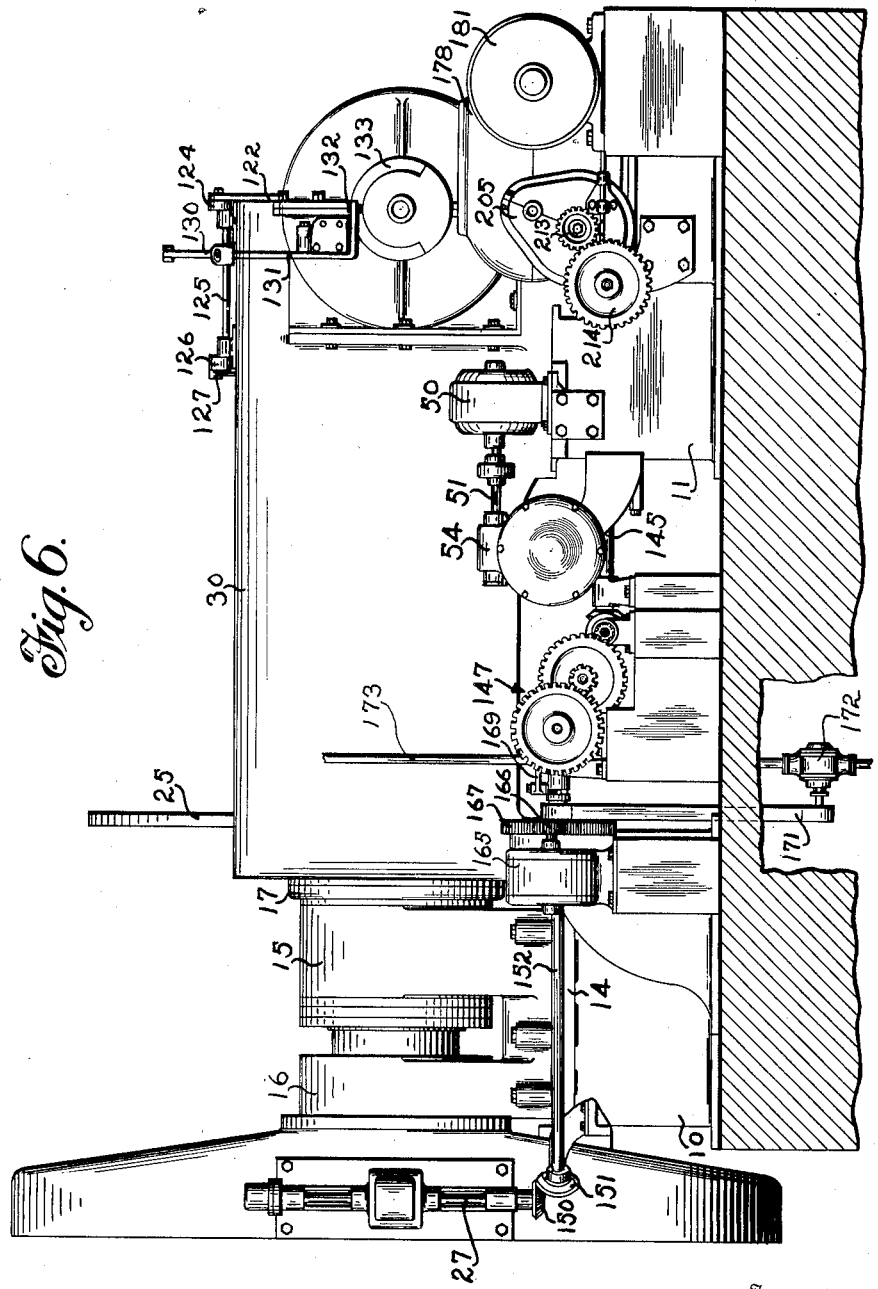
Fig. 6 is a rear elevational view of the machine.
Figure 15:
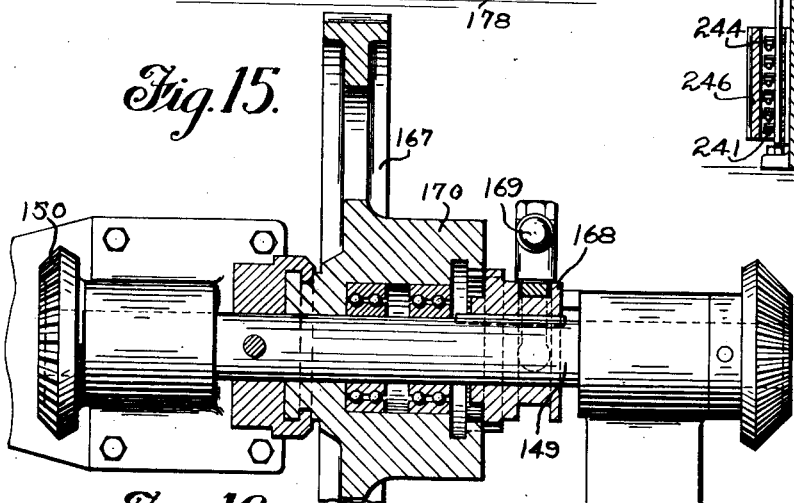
Fig. 15 is a sectional view on line 15—15 of Fig. 1.

In order that the blank and cutters may be rotated in a reverse direction which will sometimes be found desirable, I have mounted on the bedplate 10 a motor 165 having upon its shaft a gear 166 engaging with a gear 167 loosely mounted upon the shaft 149. As shown more particularly in Fig. 15, a clutch-collar 168 is provided to clutch the gear to the shaft when it is desired to reverse the direction of rotation of the blank. The clutch may be operated by the lever 169. In the operation of the machine it will usually be desirable to run the motor 165 continuously, the gear 167 normally running freely and idly upon the shaft 149. The hub of this gear is formed to provide a pulley 170 about which is trained a belt 171 which operates a lubricating pump 172 shown in Fig. 6. From the pump a pipe 173 leads to a position to deliver a lubricant to the blank and cutters.

Upon the shaft 60 is mounted a gear 175 constantly in mesh with a gear 176, shown more particularly in Fig. 10, slidably mounted upon the main driving shaft 177. This driving shaft is rotatably mounted upon the main bed of the machine, and for this reason it is necessary to have a sliding connection between it and the gear 176. The shaft 177 at its rear end passes through and is journaled in a transmission housing 178 in which is mounted a suitable change speed gearing, which will now be described. Journaled in this housing are two additional shafts, a counter-shaft 179 and a driving shaft 180 which extends from the housing and is driven by a suitable motor 181 the shaft of which is connected to the shaft 180 by a magnetic clutch 182. To the shaft 180 are secured a plurality of gears, four in number, as shown in the drawings, 183, 184, 185 and 186. Upon the counter-shaft 179 are loosely mounted four corresponding gears 187, 188, 189 and 190, each of which is constantly in mesh with one of the gears on the driving shaft. The gears on the counter-shaft are mounted in pairs, and between them are clutch collars 191 and 192 slidably keyed to the shaft whereby any of the gears may be selectively clutched to this shaft, so that it may be driven from the driving shaft. As the gears on the driving shaft, and consequently the gears on the counter-shaft which mesh therewith, are of different diameters, the counter-shaft may be driven at four different speeds from the driving shaft. Besides the four gears just described, which are loosely mounted upon the counter-shaft 179, two gears 195 and 196 are secured thereon, and are constantly in mesh respectively with gears 197 and 198 loosely mounted on the main shaft 177. A clutch collar 199 is mounted between these gears and may be shifted by means of a lever 200 to clutch either of these gears to the shaft 177. It will be apparent that the shaft 177 may be driven at two different speeds relatively to the shaft 179, and, therefore, at eight different speeds relatively to the shaft 180. It will also be noted that in my transmission mechanism I may make use of double helical gears which are advantageous for this kind of work, as I arrange for changes of speed by merely clutching various gears to the shaft upon which they are mounted and without the necessity of any sliding movement of the gears into and out of mesh with each other.

The shaft 177 drives the shaft 60 and hence furnishes the power for the main slide 56 which imparts the reciprocating and twisting movement to the cutters, and also furnishes the power through the cam disk 133 for imparting the relief movement to the cutters. The rotating movement imparted to the cutters and blank is effected through the shaft 142 which is driven from the shaft 177 by mechanism which I will now describe.

The shaft 177 extends from the transmission housing 178 at the rear end thereof and mounted upon this shaft, in a suitable housing 205, are two gears 206 and 207. These gears are constantly in mesh with gears 208 and 209, the former of which is loosely mounted upon a shaft 210, and the latter loosely mounted upon a sliding sleeve 211 keyed to this shaft. To the inner end of this sleeve is secured a clutch plate 212 disposed between the gears 208 and 209, and adapted to engage complemental clutch elements with which the gears are provided to clutch either of these gears selectively to the shaft 210. On the end of the shaft 210 is secured a spur gear 213 which meshes with a gear 214 on the end of the shaft 142, so that the latter is driven upon the rotation of the shaft 210. It will be understood that by this means the shaft 142 may be driven at two different speeds relatively to the shaft 177, and thus the rotating feeding movement of the blank and cutters may be varied relatively to the reciprocating and twisting movement of the cutters, which is sometimes desirable in the operation of the machine.

Figure 16:
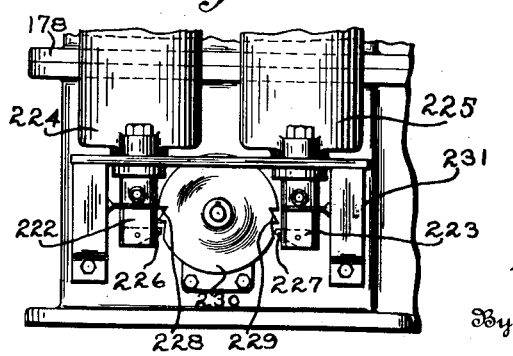
Fig. 16 is an enlarged detail front view of the solenoids and cooperating mechanism for actuating certain clutches.

Upon the sleeve 211 is mounted a collar 215 engaged by a clutch shifting yoke 216 secured to a horizontally disposed rock-shaft 217 carried in suitable bearings on the housing 205, so that upon the oscillation of this shaft the shifting yoke will move the sleeve 211 longitudinally of the shaft 210 to which it is keyed. To move the clutch-plate 212 into engagement with one or the other of the gears 208 and 209, or to an intermediate neutral position, a rock-arm 218 is connected to the shaft 217 and is in turn connected by a link 219 to a second rock-arm 220 secured at the end of a longitudinally disposed shaft 221 which passes through the transmission housing, and as shown in Fig. 16, projects from the end of this housing adjacent to the operating members 222 and 223 of solenoids 224 and 225. To the members 222 and 223 are secured fingers 226 and 227 designed to engage the teeth 228 and 229 of a disk 230 secured to the shaft 221. The solenoids may be operatively mounted upon a bracket 231 secured to the transmission housing.

Figure 14:
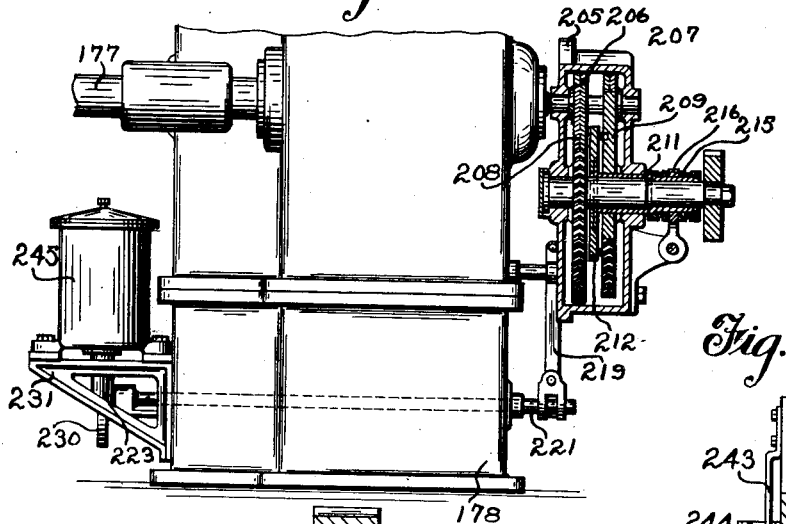
Fig. 14 is a sectional view on line 14—14 of Fig. 12.

As shown, the clutch-plate 212 is in its neutral position and the fingers 226 and 227 are shown in position to engage respectively the lower ones of the teeth 228 and 229. If, when the parts are in this position, the solenoid 224 is operated, the finger 226 engaging below the lower tooth 228 will rotate the disk one step in a clockwise direction, and will serve to move the clutch-plate 212 into engagement with the gear 208 and connect the gear to the shaft 210. If at this time the solenoid 225 is energized, the finger 227 will engage below the upper tooth 229 and move the clutch disk 212 to the right, as shown in Fig. 14, to its neutral position out of engagement with the gear 208. If the solenoid 225 is energized a second time, the disk 230 will be moved a second step in an anti-clockwise direction and will shift the clutch-plate so as to connect the gear 209 to the shaft 210.

Figure 17:
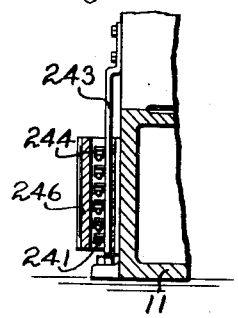
Fig. 17 is a section on line 17—17 of Fig. 3.

I have found it convenient and desirable to locate the controlling switches of the electrically operated mechanism at the upper part of the front side of the carriage, as shown at 240 in Fig. 3. As this carriage is movable with respect to the base 11 upon which the circuit wires which lead to the various mechanisms are supported, I have arranged a sliding contact device by means of which the circuits may at all times be completed by the switches, regardless of the position of the main carriage. These wires, designated generally by the numeral 241, are bare of insulation adjacent the bed, as shown in Fig. 3, and at their forward ends are connected to insulated wires carried in the cable 242. As shown more especially in Fig. 17, a trolley-arm 243 is secured to the movable carriage and carries a plurality of insulated shoes 244 in contact with the bare wires 241. From these shoes the wires lead through the cable 245 to the switches 240, so that the current may be completed through the switches. The bare wires 241 may be protected by a guard plate 246 secured to the base 11.

Figure 8:
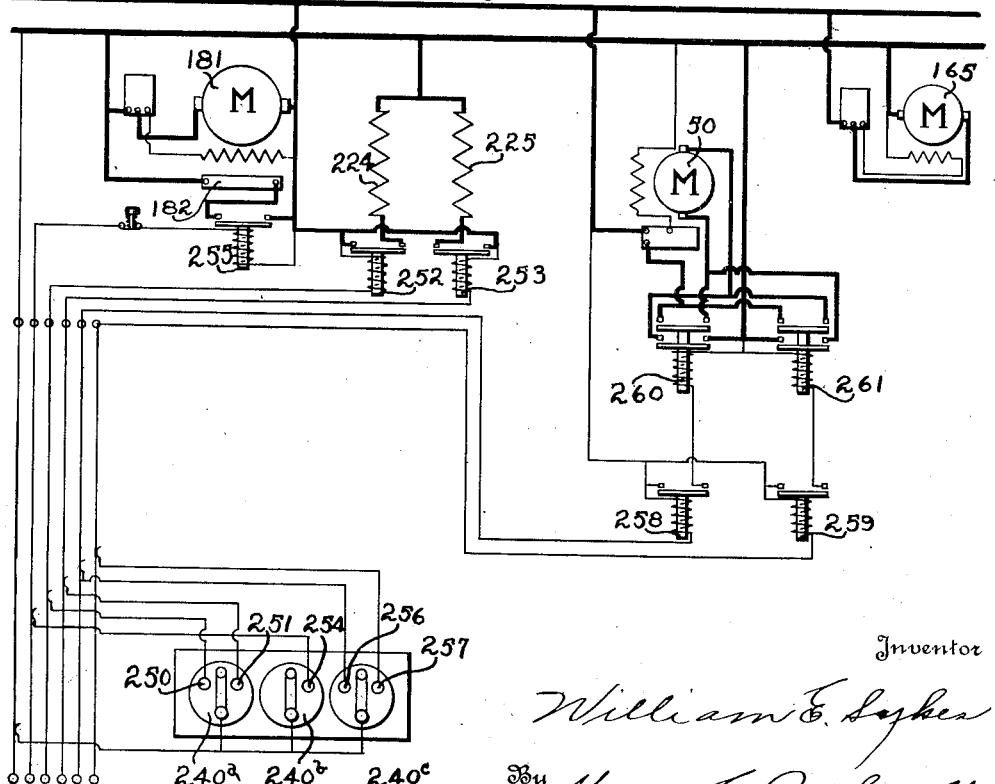
Fig. 8 is a diagrammatic view of the electrical circuits of the control mechanism.

In Fig. 8 I have shown diagrammatically the connections through which the various circuits are completed by the switches on the movable carriage. The switch 240ᵃ is a double throw switch designed to be thrown in either direction from its neutral position, shown in the drawings, into contact with the terminals 250 and 251 to energize the relays 252 and 253 which in turn complete the circuits through the solenoids 224 and 225 respectively.

The switch 240ᵇ may be moved into engagement with the contact 254 to energize the relay 255 which in turn completes the circuit through the magnetic clutch 182 which connects the prime motor 181 with the shaft 180. It will be understood that this motor is normally continuously in operation, and may be controlled in the usual or any desired manner, which I have not deemed necessary to illustrate.

The switch 240ᶜ may be placed in engagement with either of the contacts 256 or 257 to energize the relays 258 and 259 respectively, which relays in turn energize the relays 260 and 261. The relay 260 completes the circuit through the motor 50 to operate the threaded shaft 33 to set up the cutters to the work. The relay 261 also serves to complete the circuit, but causes the current to pass through the motor in an opposite direction so as to reverse the motor and back the cutters away from the work. The motor 165 which serves to rotate the blank and cutters in a reverse direction to that given them by the shaft 142, may be operated by any desired means.

The operation of my machine may be briefly described as follows:

With a gear blank mounted in position upon the shaft 18, as shown in Fig. 2, the motor 50 may be set into operation by the switch 240ᶜ to rotate the shaft 33 in a direction to feed the cutters up to the work by moving the main carriage 30 on the guideways 12 and 13. It will be understood that this motor is designed to move the carriage at a considerably greater speed than is effected by the hand wheel 45, and it is, therefore, desirable to use the motor for coarse adjustments of the carriage into a position wherein the cutters are closely adjacent to the work. It will also be understood that the driving motor 181 and the reversing motor 165 are in constant operation during the operation of the machine, both of these motors being provided with clutches by which they may be engaged with and disengaged from the shafts which they are designed to drive. The switch 240ᵇ may now be operated to actuate the magnetic clutch 182 and set the machine in operation. The desired speed of the cutting tools may be obtained through the change speed mechanism in the housing 178, whereby the cutters may be driven at eight different speeds relatively to that of the motor. Likewise, the desired speed of the feeding generating movement of the cutters and blank is obtained by shifting the clutch yoke 216 by means of the solenoids 224 or 225 to engage the gear 208 or the gear 209 with the shaft 210. The speed of the operating mechanism of the machine, as well as that of the feed are governed by a number of factors, including the hardness of the material of the blank, the kind of material used in the cutter, the form and condition of the cutter, the rigidity of the gear blank and the pitch of the gear to be cut. With the mechanism in operation, the hand wheel 45 is turned to feed the cutters toward the blank. A very fine adjustment can be obtained by means of the rotation of this hand wheel so that the proper depth of the tooth to be cut can be accurately gauged. When the carriage has been moved up to the proper position so that the cutters cut to depth in the gear blank, the feeding movement by the hand wheel 45 is stopped. The continued operation of the machine, due to the continuous generating or feeding rotary movement imparted to both the cutters and blank at the same peripheral velocities, causes the blank to be fed to the cutters until its entire periphery has been subjected to their action and teeth have been cut over the entire periphery of the blank. If, during the cutting of a gear, it is desired to cause the cutters to traverse the work a second time, the cutting mechanism may, of course, be operated at a higher speed during the second cut, and likewise, the rotating feeding movement of the cutters and blank could be effected at a higher speed. These higher speeds are obtained respectively through the change speed mechanism contained in the housing 178, and by means of the shifting of the clutch plate 212. If, for instance, the gear 209 is in engagement with the shaft 210, and it is desired to change the speed of the rotative feeding movement of the cutters and blank, the switch 240ᵃ may be moved into contact with the terminal 251. The solenoid 224 is thereby energized and the clutch plate 212 is moved out of engagement with the gear 209 into a neutral position. If the switch 240ᵃ is moved to this neutral position and again moved into contact with the terminal 251, the solenoid 224 will be again energized and the clutch plate moved to clutch the gear 208 to the shaft 210 so that the speed of the shaft 142 will be changed relatively to that of the shaft 177.

To back the cutters away from the work, the switch 240ᶜ may be operated to reverse the motor 50 so that the shaft 33 will be turned in a reverse direction and move the main carriage 30 rearwardly along the guideways 12 and 13.

If, for any reason, it is desired to reverse the rotating feeding movements of the blank and cutters, the motor 165 may be clutched to the shaft 149 by means of the shifting lever 169, and the cutters and blanks will be rotated in a reverse direction from that imparted to them by the gears 208 or 209. It will be understood that during this operation the clutch plate 212 is in its neutral position.

I do not claim herein the particular method of and means for moving the cutters across the face of the gear and relieving them therefrom upon the return stroke, or other features described and claimed in my prior applications Nos. 641,125 and 641,126, filed May 24, 1923, nor do I claim per se herein the features of the change speed mechanism shown particularly in Fig. 10 of the drawings, which are described and claimed in my application No. 699,499, filed March 15, 1924.

While I have shown and described a preferred embodiment of my invention, it will be understood that it is not to be limited to all the details shown, but is capable of modification and variation within the spirit of the invention and the scope of the appended claims.

What I claim is:

1. A gear cutting machine comprising a bed, means for supporting a gear blank upon a fixed axis on said bed, a carriage mounted on said bed for movement towards and away from the blank, a cutter mounted on said carriage and adapted to be moved with said carriage to and from cutting engagement with the blank, operating means for giving said cutter a translatory movement across the face of said blank, means for moving said carriage towards said blank until the depth of the cut produced by the action of said cutter on said blank reaches a predetermined limit, said blank being stationary during the movement of said carriage, and means for rotating said blank thereafter to cut a series of teeth on the periphery thereof while maintaining a fixed relationship between the blank axis and the carriage.

2. A gear cutting machine comprising a bed, means for supporting a gear blank upon a fixed axis on said bed, a carriage mounted on said bed for movement towards and away from the blank, a cutter mounted on said carriage and adapted to be moved with said carriage to and from cutting engagement with the blank, operating means for giving said cutter a translatory movement across the face of the blank, means for moving said carriage towards said blank until the depth of the cut produced in the blank by the action of the cutter thereon reaches a predetermined limit, said blank being stationary during the movement of said carriage, and means for giving the blank a continuous rotary movement thereafter to cut a series of teeth thereon, the axis of the blank being maintained in fixed relationship to the carriage during such rotation.

3. A gear cutting machine comprising a bed, means for supporting a gear blank upon a fixed axis on said bed, a carriage mounted on said bed for movement towards and away from the blank, a cutter mounted on said carriage and adapted to be moved with said carriage to and from cutting engagement with the blank, operating means for giving said cutter a translatory movement across the face of the blank, means for moving said carriage towards said blank until the depth of the cut produced in the blank by the action of the cutter thereon reaches a predetermined limit, and means for rotating the blank through an arc of substantially 360° thereafter, while maintaining a fixed relationship between the blank axis and the carriage.

4. A gear cutting machine comprising a bed, means for supporting a gear blank upon a fixed axis on said bed, a carriage mounted on said bed for movement towards and away from the blank, a cutter mounted on said carriage and adapted to be moved with said carriage to and from cutting engagement with the blank, operating means for giving said cutter a translatory movement across the face of said blank, means for relieving the cutter from the blank during a part of the translatory movement, means for moving said carriage towards said blank until the depth of the cut produced by the action of said cutter on said blank reaches a predetermined limit, the blank being stationary during the movement of said carriage, and means for rotating the blank after the cut has reached a predetermined limit while maintaining a fixed relationship between the blank axis and the carriage.

5. A gear cutting machine comprising a bed, means for supporting a gear blank upon a fixed axis on said bed, a carriage mounted on said bed for movement towards and away from the blank, a cutter mounted on said carriage and adapted to be moved with said carriage to and from cutting engagement with the blank, operating means for giving said cutter a translatory movement across the face of the blank, means for relieving the cutter from the blank during a part of the translatory movement, means for moving said carriage towards said blank until the depth of the cut produced in the blank by the action of the cutter thereon reaches a predetermined limit, said blank being stationary during the movement of said carriage, and means for giving the blank a continuous rotary movement thereafter to cut a series of teeth thereon, the axis of the blank being maintained in fixed relationship to the carriage during the rotation of the blank.

6. A gear cutting machine comprising a bed, means for supporting a gear blank upon a fixed axis on said bed, a carriage mounted on said bed for movement towards and away from the blank, a cutter mounted on said carriage and adapted to be moved with said carriage to and from cutting engagement with the blank, operating means for giving said cutter a translatory movement across the face of the blank, means for relieving the cutter from the blank during a part of the translatory movement, means for moving said carriage towards said blank until the depth of the cut produced in the blank by the action of the cutter thereon reaches a predetermined limit, and means for rotating the blank through an arc of substantially 360° thereafter, while maintaining a fixed relationship between the blank axis and the carriage.

7. A gear cutting machine comprising a bed, means for supporting a gear blank upon a fixed axis on said bed, a carriage mounted on said bed for movement towards and away from the blank, a cutter mounted on said carriage and adapted to be moved with said carriage to and from cutting engagement with the blank, operating means for giving said cutter a translatory movement across the face of the blank, means for giving said cutter a rotary movement during such translatory movement, means for moving said carriage towards said blank until the depth of the cut produced by the action of said cutter on said blank reaches a predetermined limit, the blank being stationary during the movement of said carriage, and means for rotating the blank and the cutter after the cut has reached a predetermined limit while maintaining a fixed relationship between the blank axis and the carriage.

8. A gear cutting machine comprising a bed, means for supporting a gear blank upon a fixed axis on said bed, a carriage mounted on said bed for movement towards and away from the blank, a cutter mounted on said carriage and adapted to be moved with said carriage to and from cutting engagement with the blank, operating means for giving said cutter a translatory movement across the face of the blank, means for giving said cutter a rotary movement during such translatory movement, means for moving said carriage towards said blank until the depth of the cut produced in the blank by the action of the cutter thereon reaches a predetermined limit, said blank being stationary during the movement of said carriage, and means for continuously rotating said cutter and blank after the cut has reached a predetermined limit, the axis of the blank being maintained in fixed relationship to the carriage during said rotation.

9. A gear cutting machine comprising a bed, means for supporting a gear blank upon a fixed axis on said bed, a carriage mounted on said bed for movement towards and away from the blank, a cutter mounted on said carriage and adapted to be moved with said carriage to and from cutting engagement with the blank, operating means for giving said cutter a translatory movement across the face of the blank, means for giving said cutter a rotary movement during such translatory movement, means for moving said carriage towards said blank until the depth of the cut produced in the blank by the action of the cutter thereon reaches a predetermined limit, and means for rotating the blank through an arc of substantially 360°, while maintaining a fixed relationship between the blank axis and the carriage.

10. A gear cutting machine comprising a bed having a horizontally disposed guideway thereon, means to mount a gear blank upon a fixed axis on the bed, a carriage slidably mounted on the bed for movement toward and from the blank axis, cutter spindles rotatably mounted on the carriage, cutters mounted on said spindles, operating mechanism for the cutters mounted on the carriage, and said cutter spindles being mounted on said carriage for movement relatively thereto in a direction transverse to their axes to relieve the cutters from the blank.

11. A gear cutting machine comprising a bed having a horizontally disposed guideway thereon, means to mount a gear blank upon a fixed axis on the bed, a carriage slidably mounted on the bed for movement toward and from the blank axis, cutter spindles rotatably mounted on the carriage, cutters mounted on said spindles, operating mechanism for the cutters mounted on the carriage, and said cutter spindles being mounted on said carriage for movement relatively thereto in a direction transverse to their axes to relieve the cutters from the blank, and means to effect independent relief movement of the cutter spindles at predetermined times in their operation.

12. In a gear cutting machine, a bed, a gear blank operatively mounted thereon, a carriage slidably mounted on the bed, cutters and cutter operating mechanism mounted on said carriage, said cutter operating mechanism including means to cause said cutters to traverse the face of the work in a reciprocatory movement, and means to rotate the cutters on their axes, a source of power, a shaft mounted on the bed and connected to said reciprocating mechanism, a second shaft mounted on the bed and connected to said cutter rotating mechanism, said connections being slidable whereby the cutter mechanism may be driven from said shafts regardless of the position of the carriage, and means for rotating said shafts.

13. In a gear cutting machine, a bed, a gear blank operatively mounted thereon, a carriage slidably mounted on the bed, cutters and cutter operating mechanism mounted on said carriage, said cutter operating mechanism including means to cause said cutters to traverse the face of the work in a reciprocatory movement, in an axial direction, and means to rotate the cutters on their axes, a source of power, a pair of shafts mounted on the bed, and means for operating said cutter operating mechanism from said shafts, including gears slidably mounted on said shafts and connected to said operating mechanism.

14. In a gear cutting machine, a bed, means for operatively mounting a blank thereon, a carriage movably mounted on said bed, cutters and cutter operating mechanism mounted on said carriage, means for moving said carriage toward and away from the blank to feed the cutters to the work, and both manually and power operated means to actuate said moving means in either direction.

15. In a gear cutting machine, a bed, means for operatively mounting a blank thereon, a carriage movably mounted on said bed, cutters and cutter operating mechanism mounted on said carriage, means for moving said carriage toward and away from the blank to feed the cutters to the work, said means including both fast and slow acting means for coarse and fine adjustments.

16. In a gear cutting machine, a bed, means for operatively mounting a blank thereon, a carriage movably mounted on said bed, cutters and cutter operating mechanism mounted on said carriage, means for moving said carriage toward the blank to feed the cutters to the work, said means including a threaded shaft rotatably mounted on the bed, a sleeve rotatably mounted on the carriage and provided with threads engaging those of the shaft, and means to rotate said shaft while said sleeve is held stationary.

17. In a gear cutting machine, a bed, means for operatively mounting a gear blank thereon, a carriage movably mounted on said bed, cutters and cutter operating mechanism mounted on said carriage, means for moving said carriage toward the blank to feed the cutters to the work, said means including a threaded shaft rotatably mounted on the bed, a sleeve rotatably mounted on the carriage and provided with threads engaging those of the shaft, and means to rotate said sleeve while said shaft is held in a stationary position.

18. In a gear cutting machine, a bed, means for operatively mounting a gear blank thereon, a carriage movably mounted on said bed, cutters and cutter operating mechanism mounted on said carriage, means for moving said carriage toward the blank to feed the cutters to the work, said means including a threaded shaft rotatably mounted on the bed, a sleeve rotatably mounted on the carriage and provided with threads engaging those of the shaft, and means to rotate either said shaft or sleeve while the other of said elements is held in a stationary position.

19. In a gear cutting machine, a frame, means for operatively mounting a gear blank on the frame, cutters mounted on the frame to operate on said blank, means for effecting a relative feeding movement of the blank and cutters, comprising a carriage movably mounted on the frame, a shaft threadedly engaged with said carriage, and both manually and power operated means to actuate said shaft.

20. In a gear cutting machine, a frame, means for mounting a gear blank on said frame, a carriage movably mounted on the frame, cutting mechanism operatively supported on the carriage, means for moving said carriage toward and away from the blank to feed and withdraw the cutters from the work, including a threaded shaft, a motor to drive said shaft, and means for reversing the direction of the motor.

21. In a gear cutting machine, a frame, means for mounting a gear blank on the frame, a carriage slidably mounted on the frame, a cutting mechanism mounted on said carriage, means to move said carriage toward and from the gear blank to feed the cutters to the work and withdraw them therefrom, and both manually and power operated means to operate said moving means to move the carriage in either direction.

22. In a gear cutting machine, a frame, means for mounting a gear blank on the frame, a carriage slidably mounted on the frame, a cutting mechanism mounted on said carriage, means to move said carriage toward and from the gear blank to feed the cutters to the work and withdraw them therefrom, and both manually and power operated means to operate said moving means to move the carriage in either direction, said power operated means comprising a reversing motor mounted on the frame and adapted to be driven in either direction.

23. In a gear cutting machine, a bed, means for operatively mounting a gear blank on the bed, cutting mechanism comprising cutters mounted to move across the face of the gear blank to cut gear teeth therein, means to impart a continuous generating rotary movement to the cutters and blank, a power source and a change speed mechanism whereby said cutting mechanism and blank may be driven from the power source at a plurality of speeds.

24. In a gear cutting machine, a bed, means for operatively mounting a gear blank on the bed, cutting mechanism including cutters mounted to move across the face of the gear blank and to rotate in conjunction with the blank, driving mechanism to impart said movements to the cutters, a motor, a change speed mechanism interposed between said motor and driving mechanism whereby the latter may be operated from the motor at a plurality of different speeds.

25. In a gear cutting machine, a bed, means for operatively mounting a gear blank on the bed, a carriage movably mounted on the bed, cutters and operating mechanism therefor mounted on the carriage, a driving shaft on the bed connected to said operating mechanism, a motor mounted on the bed and a change speed mechanism interposed between said motor and drive shaft, whereby the latter may be operated at a plurality of different speeds from the motor.

26. In a gear cutting machine, a bed, means for operatively mounting a gear blank on the bed, cutters mounted adjacent the blank and operating mechanism for said cutters, said operating mechanism comprising means to cause a reciprocating movement of said cutters across the face of the gear blank, and means to impart a rotary feeding movement to the blank and cutters, a shaft from which both said means are driven and a change speed gearing to impart said feeding movement to the blank and cutters at a plurality of different speeds relatively to the reciprocatory movement of the cutters.

27. In a gear cutting machine, a bed, means for operatively mounting a gear blank on the bed, cutters mounted adjacent the blank and operating mechanism for said cutters, said operating mechanism comprising means to cause a reciprocating movement of said cutters across the face of the gear blank, and means to impart a rotary feeding movement to the blank and cutters, a shaft from which both said means are driven, a second shaft for imparting a rotary feeding movement to the blank and cutters and a change speed gearing between said first and second shafts.

28. In a gear cutting machine, a bed, means for operatively mounting a gear blank on the bed, cutters mounted adjacent the blank and operating mechanism for said cutters, said operating mechanism comprising means to cause a reciprocating movement of said cutters across the face of the gear blank, and means to impart a rotary feeding movement to the blank and cutters, a shaft from which both said means are driven, a second shaft for imparting a rotary feeding movement to the blank and cutters and a change speed gearing between said first and second shafts, said change speed gearing including a countershaft mounted between said first named shafts and geared to one thereof, a pair of gears loosely mounted on said countershaft and in mesh respectively with the gears mounted on the other shaft and means to clutch either of said gears to said countershaft.

29. In a gear cutting machine, means for supporting a gear blank, cutters, means for reciprocating said cutters across the face of the gear blank, means for imparting a rotary feeding movement to the blank and cutters, and a change speed gearing whereby the feeding motion may be effected at a plurality of speeds relatively to the reciprocating motion.

30. In a gear cutting machine, means for supporting a gear blank, cutters, means for reciprocating said cutters across the face of the gear blank, means for imparting a rotary feeding movement to the blank and cutters, and a change speed gearing whereby the feeding motion may be effected at a plurality of speeds relatively to the reciprocating motion, said gearing including a driving shaft, gears on said shaft, a second shaft, gears loosely mounted on said shaft and means to clutch either of said gears to the second shaft.

31. In a gear cutting machine, means for supporting a gear blank, cutters, means for reciprocating said cutters across the face of the gear blank, means for imparting a rotary feeding movement to the blank and cutters, and a change speed gearing whereby the feeding motion may be effected at a plurality of speeds relatively to the reciprocating motion, said gearing including a driving shaft having gears mounted thereon, a second shaft, a gear loosely mounted on said second shaft, a sleeve slidably keyed to said second shaft, a second gear loosely mounted on said sleeve, a clutch secured to said sleeve between said gears, and means for shifting said clutch to connect either of said gears to the shaft.

32. In a gear cutting machine, a bed, means for operatively mounting a blank thereon, a cutter carriage slidably mounted on the bed, cutters mounted on the carriage, means to impart a reciprocatory movement to the cutters across the face of the blank, means to impart a rotary generating feeding movement simultaneously to the cutters and the blank, a shaft from which both said means are driven and a sliding connection between said shaft and said means for reciprocating the cutters.

33. In a gear cutting machine, a bed, means for operatively mounting a blank thereon, a cutter carriage slidably mounted on the bed, cutters mounted on the carriage, means to impart a reciprocatory movement to the cutters across the face of the blank, means to impart a rotary generating feeding movement simultaneously to the cutters and the blank, a shaft from which both said means are driven, a sliding connection between said shaft and said means for reciprocating the cutters, and a change speed gearing between said shaft and said means for imparting the rotary feeding movement to the cutters and blank.

34. In a gear cutting machine, a bed, means for operatively mounting a blank thereon, a cutter carriage slidably mounted on the bed, cutters mounted on the carriage, means to impart a reciprocatory movement to the cutters across the face of the blank, means to impart a rotary generating feeding movement simultaneously to the cutters and the blank, a shaft from which both said means are driven, a sliding connection between said shaft and said means for reciprocating the cutters, a motor and a change speed gearing for driving said shaft at a plurality of different speeds from the motor.

35. In a gear cutting machine, a frame, cutters operatively mounted on the frame, a gear blank mounted on the frame, means to impart a rotary feeding movement to the cutters and blank in one direction, and means to reverse the direction of said movement.

36. In a gear cutting machine, a frame, cutters operatively mounted on the frame, a gear blank mounted on the frame, means to impart a rotary feeding movement to the cutters and blank in one direction, and means to reverse the direction of said movement, including a motor, a shaft connected to the cutters and blank, a gear loosely mounted on said shaft and driven from the motor, and means to clutch said gear to said shaft.

37. In a gear cutting machine, a bed, means for mounting a gear blank mounted on the bed, cutters operatively adjacent the blank, means for imparting a rotary feeding movement to the blank and cutters including a shaft, a continuously rotated member loosely mounted on said shaft, and means for clutching said member to the shaft to reverse the direction of said feeding movement.

38. In a gear cutting machine, means for supporting a gear blank, cutters operatively mounted adjacent the blank, operating mechanism for said cutters including a shaft, a motor to drive said shaft, and means for engaging said motor with and disengaging it from said shaft from a position remote from the motor.

39. In a gear cutting machine, means for supporting a gear blank, cutters operatively mounted adjacent the blank, operating mechanism for said cutters including a shaft, a motor to drive said shaft, a clutch for connecting the motor to said shaft and means for controlling said clutch from a position remote therefrom.

40. In a gear cutting machine, means for supporting a gear blank, cutters operatively mounted adjacent the blank, operating mechanism for said cutters including a shaft, a motor to drive said shaft, a clutch for connecting the motor to said shaft and an electrically controlled means for operating said clutch.

41. In a gear cutting machine, means for operatively supporting a gear blank, cutters mounted adjacent the blank, operating means for said cutters, a source of power for driving said operating means, a speed change mechanism between said source of power and said operating means, and electrically controlled means for operating said speed change mechanism.

42. In a gear cutting machine, means for operatively supporting a gear blank, cutters mounted adjacent the blank, operating means for said cutters, a source of power for driving said operating means, a speed change mechanism between said source of power and said operating means, and electrically controlled means for operating said speed change mechanism, including a shifting element and means for actuating said element, including a solenoid operatively engaged therewith.

43. In a gear cutting machine, means for operatively supporting a gear blank, cutters mounted adjacent the blank, operating means for said cutters, a source of power for driving said operating means, a speed change mechanism between said source of power and said operating means, and electrically controlled means for operating said speed change mechanism, including a shifting element and means for operating said element in either direction, including a pair of solenoids adapted to be operatively engaged therewith.

44. In a gear cutting machine, means for operatively supporting a gear blank, cutters mounted adjacent the blank, operating means for said cutters, a source of power for driving said operating means, a speed change mechanism between said source of power and said operating means, and electrically controlled means for operating said speed change mechanism, including a shifting element and means for operating said element in either direction, including a pair of solenoids adapted to be operatively engaged therewith, and means for selectively energizing said solenoids.

45. In a gear cutting machine, means for operatively supporting a gear blank, cutters mounted adjacent the blank, operating means for said cutters, a source of power for driving said operating means, a speed change mechanism between said source of power and said operating means, and electrically controlled means for operating said speed change mechanism, including a rock shaft, means for oscillating said shaft in either direction including a double disk secured to the shaft, a solenoid on either side of said disk, means to engage the movable element of the solenoids with the disk, and means to selectively energize the solenoids.

46. In a gear cutting machine, a bed, means for supporting a gear blank thereon, a carriage movably mounted on the bed, cutters and cutter operating mechanism mounted on the carriage, an electrical device mounted on the bed, a controlling switch for said device mounted on the carriage, and means for conducting the current from said switch to said electrical device.

47. In a gear cutting machine, a bed, a carriage slidably mounted on the bed, cutters and cutter operating mechanism mounted on the carriage, electrical devices mounted on the bed for operating said cutter operating mechanism, and means for controlling said electrical devices including controlling switches mounted on the carriage and operatively connected to control said devices.

48. In a gear cutting machine, a bed, a carriage slidably mounted on the bed, cutters and cutter operating mechanism mounted on the carriage, electrical devices mounted on the bed for operating said cutter operating mechanism, controlling mechanism on said devices, controlling switches on the carriage, and means for conducting current from said switches to said controlling mechanism including a plurality of bare wires secured to the bed, contacts secured to the carriage and adapted to slide on said wires and conductors leading from said contacts to said switches.

49. In a gear cutting machine, a bed, means for rotatably mounting a gear blank on the bed, a carriage slidably mounted on the bed, cutters rotatably mounted on the carriage to operate on the bear blank, a fixed source of power on the bed, means to cause said cutters to traverse the face of the work in a reciprocating movement and in a helical path, separate means for rotating said cutters, and separate connections between said source of power and the cutter reciprocating and rotating means to operate the latter, regardless of the position of the carriage.

50. In a gear cutting machine, a bed, means for rotatably mounting a gear blank thereon, a carriage slidably mounted on the bed, cutters operatively mounted on the carriage, cutter actuating mechanism for causing the cutters to traverse the blank in a helical path, means to rotate the cutters and blank at the same peripheral speeds, a source of power on the bed, and separate connections from said source of power to said cutter actuating mechanism and said means, for rotating the blank and cutters.

51. In a gear cutting machine, a frame, means for mounting a gear blank on the frame, a carriage slidably mounted on the frame, cutting mechanism mounted on the carriage, means to move said carriage toward and from the gear blank to feed the cutters to the work and withdraw them therefrom, power operable means to operate said moving means, and a reversing motor connected to said power operable means whereby said carriage may be moved in either direction.

52. In a gear cutting machine, a bed, a gear blank operatively mounted thereon, cutters movably mounted on the bed for movement to and from said blank, means for reciprocating said cutters across the face of the blank, means for rotating said cutters on their axes, a pair of shafts mounted on the bed, means for rotating said shafts and movable connections between said shafts and said reciprocating means, and rotating means, respectively.

53. In a gear cutting machine, a bed, a gear blank rotatably mounted thereon, means on the bed for rotating said blank, a carriage movably mounted on the bed, cutters mounted on the carriage, means for reciprocating said cutters across the face of the gear blank, means for rotating said cutters on their axes, and power transmitting connections between said blank rotating means on the bed and said cutter rotating means on the carriage.

54. In a gear cutting machine, a bed, means for operatively supporting a gear blank thereon, cutters and operating mechanism therefor mounted on the bed for movement to and from the gear blank, power operated means to move said cutters toward the blank and reversing means for said power operated means to withdraw the cutters from the blank.

In witness whereof, I have hereunto set my hand this 20th day of December, 1923.

WILLIAM EDWIN SYKES.